UNITED STATES PATENT OFFICE.

HUGO GELDERMANN, OF GROSS-LICHTERFELDE-OST, NEAR BERLIN, GERMANY, ASSIGNOR TO ACTIEN GESELLSCHAFT FÜR ANILIN FABRIKATION, OF BERLIN, GERMANY.

YELLOW MONOAZO DYE AND PROCESS OF MAKING SAME.

988,870.  Specification of Letters Patent.  Patented Apr. 4, 1911.

No Drawing.  Application filed December 30, 1910. Serial No. 600,105.

*To all whom it may concern:*

Be it known that I, HUGO GELDERMANN, a subject of the Emperor of Germany, residing at Gross-Lichterfelde-Ost, near Berlin, Germany, and my post-office address being Grabenstrasse 12, Gross-Lichterfelde-Ost, near Berlin, Germany, have invented certain new and useful Improvements in New Yellow Monoazo Dye and Processes of Making the Same, of which the following is a specification.

I have found that by diazotizing 2-chloroanilin and combining the diazo compound thus obtained with para-nitro-1-phenyl-3-methyl-5-pyrazolon, which is prepared for example by nitration of the 1-phenyl-3-methyl-5-pyrazolon, a new yellow monoazo dye is obtained. The new product is distinguished by a great fastness to light and is more especially adapted for the manufacture of color-lakes, showing intense yellow tints of great fastness to light. In manufacturing such color lakes the dye may be mixed in the usual manner with a suitable lake-substratum, such as hydrate of aluminium, zinc-white, blanc-fixe; but the lakes may also be produced in combining the formation of the dye with the manufacture of the lakes.

The following example may serve to illustrate my invention, the parts being by weight: 12.7 parts of 2-chloroanilin are diazotized in the usual manner by means of 50 parts of hydrochloric acid of 12° Bé. and 7 parts of sodium nitrite. The diazo solution thus obtained is allowed to run while stirring into an aqueous solution of para-nitro-1-phenyl-3-methyl-5-pyrazolon prepared from 22 parts of this compound, 12 parts of caustic soda lye 40° Bé. and 16.5 parts of sodium carbonate. The azo dye separates, it is drained and thoroughly washed with water. In order to use the dye for industrial purposes it may be directly used in the form of a paste as obtained above or this paste may be dried and finely pulverized.

The new dye as above obtained forms in the dry and pulverized shape an intense yellow powder which is practically insoluble in water, alcohol and linseed-oil varnish. In benzene it is very difficultly soluble with a red-yellow color. In concentrated sulfuric acid the dye dissolves to a yellow solution which solution by adding ice separates the dye in yellow flakes. On boiling with zinc-dust in water-suspension the dye is decolorized, by oxidation at the atmospheric air the mass assumes a reddish color.

It is obvious to those skilled in the art that my invention is not limited to the foregoing example or to the details given therein. Of course instead of combining the diazo compound of 2-chloroanilin with para-nitro-1-phenyl-3-methyl-5-pyrazolon the diazo compound may be combined with ethylacetoacetate and the azo derivative thus obtained may then be condensed with para-nitrophenyl-hydrazin to produce the corresponding pyrazolon-azo dye.

Having now described my invention and the manner in which it may be performed, what I claim is,—

The hereinbefore-described new monoazo dye derived from 2-chloroanilin and para-nitro-1-phenyl-3-methyl-5-pyrazolon, which new dye may be obtained by diazotizing 2-chloroanilin and combining the diazo compound thus obtained with para-nitro-1-phenyl-3-methyl-5-pyrazolon, this new dye forming in the dry and pulverized shape an intense yellow powder which is practically insoluble in water, alcohol and linseed-oil varnish and very difficultly soluble in benzene to a red-yellow solution, whereas it dissolves in concentrated sulfuric acid to a yellow solution, from which solution the dye is separated in yellow flakes by the addition of ice, and which new dye if boiled with zinc-dust in suspension with water is decolorized and is reoxidized at the atmospheric air showing a reddish color, this new dye being especially adapted for the manufacture of color lakes and pigment colors, which lakes or colors show an intense and brilliant yellow tint and are very fast against the action of light.

In testimony whereof I have hereunto set my hand in presence of two subscribing witnesses.

HUGO GELDERMANN.

Witnesses:
HENRY HASPER,
WOLDEMAR HAUPT.